April 25, 1950     W. F. AMON, JR     2,505,081
LIGHT-POLARIZING SHEET OF MOLECULARLY ORIENTED POLYVINYL
ALCOHOL CONTAINING REACTION PRODUCT OF A SULFIDE AND A
SALT OF THE GROUP CONSISTING OF WATER SOLUBLE NICKEL
SALTS AND WATER SOLUBLE COBALT SALTS
Filed June 7, 1947

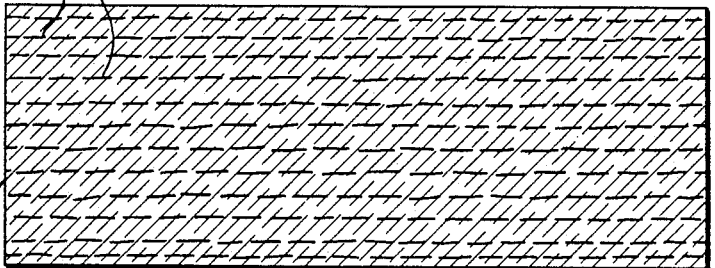

Oriented Dichroic Reaction Product of a Water-Soluble Sulfide and a Water-Soluble Salt of the Group Consisting of Nickel and Cobalt Salts Molecularly Oriented Polyvinyl Alcohol William F. Amon, Jr.
INVENTOR BY Donald L. Brown
Attorney Patented Apr. 25, 1950

2,505,081

UNITED STATES PATENT OFFICE 2,505,081

LIGHT-POLARIZING SHEET OF MOLECULARLY ORIENTED POLYVINYL ALCOHOL CONTAINING REACTION PRODUCT OF A SULFIDE AND A SALT OF THE GROUP CONSISTING OF WATER SOLUBLE NICKEL SALTS AND WATER SOLUBLE COBALT SALTS

William F. Amon, Jr., Boston, Mass., assignor to Polaroid Corporation, Cambridge, Mass., a corporation of Delaware Application June 7, 1947, Serial No. 753,366

3 Claims. (Cl. 88—65)

This invention relates to new and improved light-polarizing material.

This application is a continuation-in-part of my application Serial No. 547,034, filed July 28, 1944, now abandoned.

An object of the invention is to provide economical and stable light-polarizing material in sheet form. Other objects will be apparent to those skilled in the art from the disclosures herein made.

For a fuller understanding of the invention reference should be had to the following description taken in connection with the accompanying drawing, which is a diagrammatic view in section of one embodiment of the invention.

In accordance with one aspect of this invention there is provided a light-polarizing body comprising a sheet of molecularly oriented polyvinyl alcohol in which is incorporated a water-insoluble reaction product of a salt of the group consisting of nickel and cobalt salts and a sulfide formed in situ in said sheet and which is also molecularly oriented. Thus the polarizing material may be the product of the reaction of nickel chloride and alkaline sodium sulfide, or cobalt chloride and hydrogen sulfide, separately applied to the sheet in aqueous solution.

The light-polarizing body may be prepared by impregnating a sheet of polyvinyl alcohol successively in either order with an aqueous solution containing ions of the group consisting of nickel and cobalt ions, and an aqueous solution containing sulfide ions capable of reacting to form a reaction product in situ. In order to orient the molecules of the polyvinyl alcohol sheet and the reaction product particles with their polarizing axes in substantial parallelism, the sheet may be stretched, preferably under the influence of heat, to approximately six times its original length. As a result of this stretching, the molecules of the polyvinyl alcohol are oriented, and simultaneously orientation of the particles of the reaction product is brought about.

Generally, it will be found desirable to provide the polarizing sheet of the invention with outer protective layers in a manner well known to the art. Thus, the polarizing sheet of this invention may be bonded between a pair of layers of glass or a pair of layers of transparent plastic material by means of adhesive. While suitable adhesives are well known to the art, examples thereof which may be mentioned are plasticized polyvinyl butyral resin, and butyl methacrylate.

Light-polarizing bodies in accordance with this invention are highly uniform in properties. They are substantially free from haze, and therefore exhibit high transparency. Furthermore, they possess the outstanding advantage of ease and simplicity of manufacture. Moreover the reaction product polarizing material of this invention possesses great stability to heat, to ultra-violet radiation and to moisture.

Specific examples of preferred forms of this invention and preferred methods of preparation are as follows:

Example 1

A sheet of polyvinyl alcohol having a thickness of about 0.005 inch was immersed for about 75 seconds in a 10% aqueous solution of nickel chloride, after which it was washed with water to remove nickel chloride solution remaining on the surface of the sheet. The polyvinyl alcohol sheet was then immersed for about 30 seconds in an alkaline saturated aqueous solution of sodium sulfide.

The sheet was then washed briefly with alcohol, and wiped and dried. Following the drying of the polyvinyl alcohol sheet, it was stretched at a temperature of about 130° C. to about six times its original length.

The resulting transparent, oriented light-polarizing sheet, when examined through a neutral analyzer, exhibited a blue color when the axis of the sheet was parallel to the analyzer, changing to a deep blue when the axes of the analyzer and sheet were crossed.

Example 2

A sheet of polyvinyl alcohol having a thickness of about 0.005 inch was immersed for about 75 seconds in a 10% aqueous solution of cobalt chloride, after which it was washed with water to remove cobalt chloride solution remaining on the surface of the sheet. The polyvinyl alcohol sheet was then immersed for about 30 seconds in a saturated aqueous solution of hydrogen sulfide.

The sheet was then washed briefly with alcohol, and wiped and dried. Following the drying of the polyvinyl alcohol sheet, it was stretched at a temperature of about 130° C. to about six times its original length.

The resulting transparent, oriented light-polarizing sheet, when examined through a neutral analyzer, exhibited a blue color when the axis of the sheet was parallel to the analyzer, changing to dark blue when the axes of the analyzer and sheet were crossed.

The exact nature of the products formed in the polyvinyl alcohol sheets by the reactions in situ between the nickel chloride and the alkaline sodium sulfide, and between the cobalt chloride and the hydrogen sulfide, as described in the above examples, is not definitely known, but they may be forms of nickel sulfide, and cobalt sulfide, respectively. But whatever the exact nature of the polarizing materials of this invention may be, they are readily and uniformly reproducible, and exhibit uniformly the advantageous characteristics herein described.

It will be understood that various alternatives may be employed in carrying out this invention. Other solutions containing the nickel, cobalt, and sulfide ions respectively, may be employed. Thus, referring to Example 1, nickel nitrate may be employed in place of nickel chloride. Furthermore, the sodium sulfide solution need not be saturated, but may be employed in concentrations at least as low as 10%. However, the sulfide solution is preferably alkaline. Referring to Example 2, cobalt nitrate may be used in place of cobalt chloride, but an acidic sulfide solution is preferred for use with cobalt salts. Furthermore, the polyvinyl alcohol sheet may be treated with these solutions in any desired sequence.

If desired, the polyvinyl alcohol sheet initially may be cast from a water solution containing a nickel or cobalt salt in relatively low concentration. In this manner one of the steps involving the treatment of polyvinyl alcohol sheet with solution may be omitted.

The temperature at which the polyvinyl alcohol sheet is stretched is not critical although such temperature should not be higher than that at which the polyvinyl alcohol tends to flow. Thus temperatures of from about 120° C. to about 170° C. have been found suitable.

Generally speaking, for the purposes of the invention the polyvinyl alcohol sheet may be stretched so as to extend the sheet approximately two and one-half to eight times its original length. Ordinarily the greater the stretch of the polyvinyl alcohol sheet, the more efficient will be the resulting light-polarizing body.

If desired the polyvinyl alcohol sheet may be stretched before it has been treated with the nickel or cobalt, and sulfide solutions. However, where this procedure is followed, it is generally necessary to dry and restretch the polyvinyl alcohol sheet following the steps of treating the sheet with the salt solutions. This is because the polyvinyl alcohol sheet tends to shrink as a result of the solution-treating steps.

It will be noted that the product of this invention is simple and economical to manufacture. Furthermore, the polarizing particles of reaction product as formed in accordance with this invention are of optimum size and character in that they produce minimum haze, and consequently maximum transparency in the polarizing sheet.

Since certain changes may be made in the above product without departing from the scope of the invention herein involved, it is intended that all matter contained in the above description shall be interpreted as illustrative and not in a limiting sense.

What is claimed is:

1. A substantially haze-free light-polarizing sheet comprising molecularly oriented polyvinyl alcohol having incorporated therein the transparent, highly dichroic, heat-stable, molecularly oriented, water-insoluble product comprising polyvinyl alcohol, sulfide ions and ions of at least one of the metals from the group consisting of cobalt and nickel, which is the chemical reaction product of the imbibition into the polyvinyl alcohol sheet of an excess over the stoichiometric amount of a water-soluble sulfide and a relatively low concentration of a salt of the group consisting of water-soluble nickel salts and water-soluble cobalt salts, the dichroism of said sheet deriving essentially from said molecularly oriented reaction product.

2. A substantially haze-free light-polarizing sheet comprising molecularly oriented polyvinyl alcohol having incorporated therein the transparent, highly dichroic, heat-stable, molecularly oriented, water-insoluble product comprising polyvinyl alcohol, sulfide ions and nickel ions, which is the chemical reaction product of the imbibition into the polyvinyl alcohol sheet of a relatively low concentration of nickel chloride and an excess over the stoichiometric amount of alkaline sodium sulfide, the dichroism of said sheet deriving essentially from said molecularly oriented reaction product.

3. A substantially haze-free light-polarizing sheet comprising molecularly oriented polyvinyl alcohol having incorporated therein the transparent, highly dichroic, heat-stable, molecularly oriented, water-insoluble product comprising polyvinyl alcohol, sulfide ions and cobalt ions, which is the chemical reaction product of the imbibition into the polyvinyl alcohol sheet of a relatively low concentration of cobalt chloride and an excess over the stoichiometric amount of hydrogen sulfide, the dichroism of said sheet deriving essentially from said molecularly oriented reaction product.

WILLIAM F. AMON, JR.

REFERENCES CITED

The following references are of record in the file of this patent:

UNITED STATES PATENTS

| Number | Name | Date |
| --- | --- | --- |
| 1,629,161 | Hermann et al. | May 17, 1927 |
| 2,215,196 | Schlack | Sept. 17, 1940 |
| 2,237,567 | Land | Apr. 8, 1941 |
| 2,328,219 | Land | Aug. 31, 1943 |